July 30, 1968     A. BRUEDER     3,394,615
STEERING WHEELS AND METHOD OF MAKING SAME
Filed Dec. 1, 1965     2 Sheets-Sheet 1
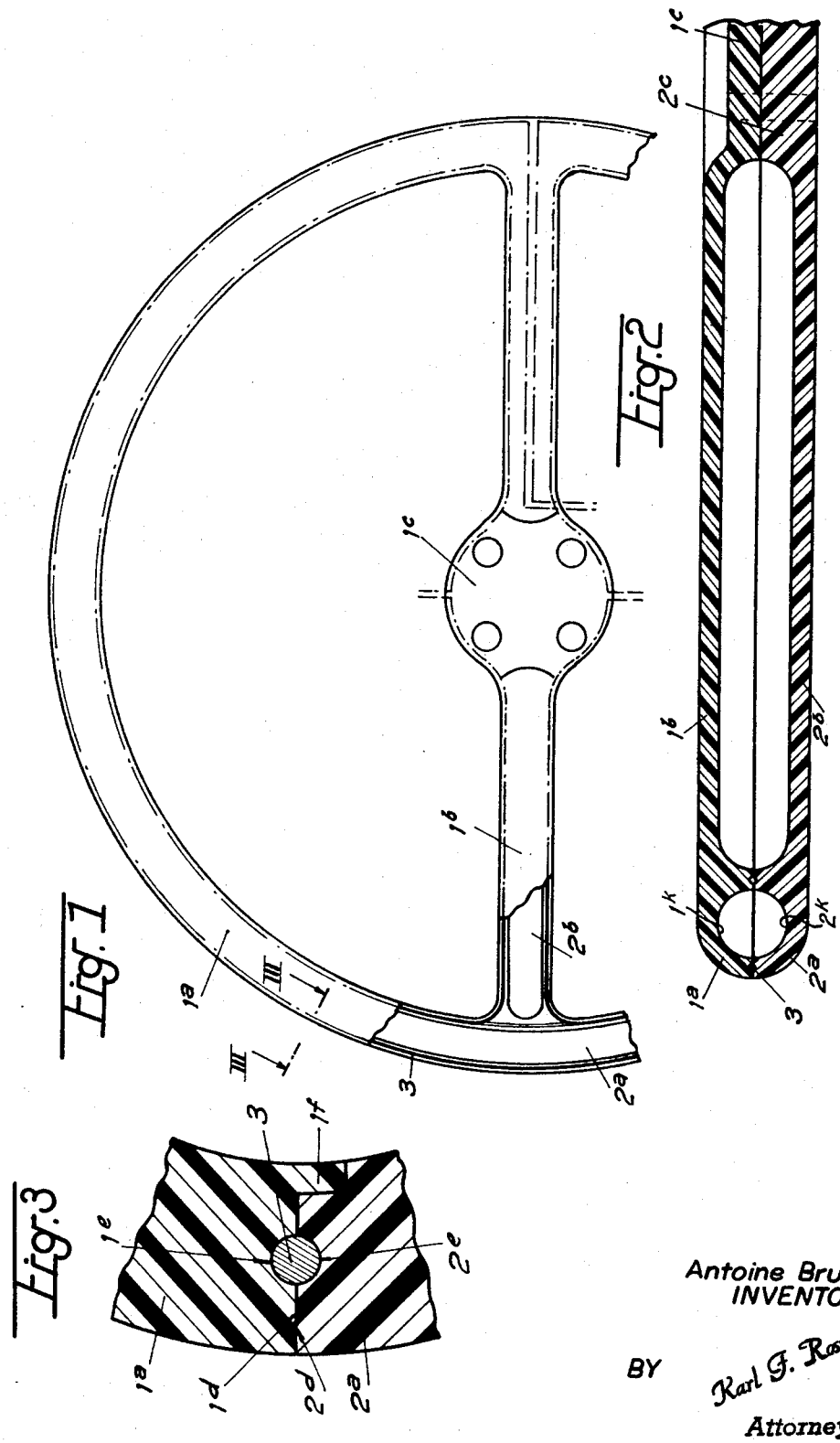
Antoine Brueder
INVENTOR.
BY *Karl F. Ross*
Attorney Antoine Brueder
INVENTOR.

BY Karl G. Ross
Attorney

United States Patent Office 3,394,615
Patented July 30, 1968

3,394,615
STEERING WHEELS AND METHOD
OF MAKING SAME
Antoine Brueder, Paris, France, assignor to Societe
Anonyme André Citroen, Paris, France, a company of France
Filed Dec. 1, 1965, Ser. No. 510,748
Claims priority, application France, Dec. 10, 1964,
3,163
4 Claims. (Cl. 74—552)

ABSTRACT OF THE DISCLOSURE

Method of making a hollow steering wheel by molding from a thermoplastic material a pair of complementarily joinable annular and substantially coextensive wheel halves while providing them with an annular concavity, said wheel halves having mutually contactable surfaces extending along said concavity; disposing along at least one of said surfaces an electrically energizable resistance-heating wire; assembling said halves to bring said surfaces into mutually contacting relationship; and passing an electric current through said wire to heat said halves at said surfaces and fuse them together.

---

This invention relates to a method for manufacturing steering wheels and to wheels manufactured thereby.

If it is desired to manufacture a steering wheel which is hollow and therefore light, it is not possible to obtain it by injection-molding plastic material in a single piece. It is necessary in this case to form initially the annular part of the wheel, and then weld it to the spokes; this weld is not aesthetically pleasing and should, as a result, be avoided.

The present invention has for its object a method of manufacturing a wheel of plastic material which readily allows a wheel to have a hollow form and an aesthetically pleasing appearance.

According to the present invention there is provided a method for the manufacture of a hollow steering wheel of a synthetic resin, which involves forming one part to serve as a half of the wheel divided on the median plane of the wheel normal to the axis of rotation thereof, forming another part serving as the other half, both said parts having mating surfaces, and assembling the two halves together at the mating surfaces.

The assembly of the two parts may be effected by adhesives, by welding, or by riveting.

In one particular embodiment in accordance with the invention, a resistance wire is arranged in a groove formed in at least one of the contact or mating surfaces of one of the parts, the two parts then being brought together, and an electric current is passed through the wire in such a manner as to produce a thermal weld between the two parts.

It is also possible to join the parts by other means, for example, by ultrasonic or by high-frequency welding.

In another embodiment in accordance with the invention, at the mating surfaces of one of the parts, securing nipples are provided which are capable of being forced into recesses provided in the surface of the joint of the other part, the two surfaces of the joint are coated with an adhesive or a solvent for the plastic material of which the parts are formed, and the two parts are brought together, while at the same time the nipples are fitted into their recesses.

In a third embodiment in accordance with the invention, there are provided, in addition to the aforementioned, securing nipples on one part capable of being forced into completing recesses of the other part, internal cross-pieces rigid with the first part. The joining of the parts and the fitting of the nipples into their recesses and accompanied by a riveting of the cross-pieces to the second part.

Various embodiments of a steering wheel in accordance with the invention will now be described, by way of example, with reference to the accompanying drawings in which:

FIG. 1 is an elevational view, with parts cut away, of a steering wheel representing a first embodiment of my invention;

FIG. 2 is a view of the wheel in section along an axial plane passing through one of the arms or spokes;

FIG. 3 is a cross-section, drawing to an enlarged scale, on line III—III of FIG. 1;

Figure 6:
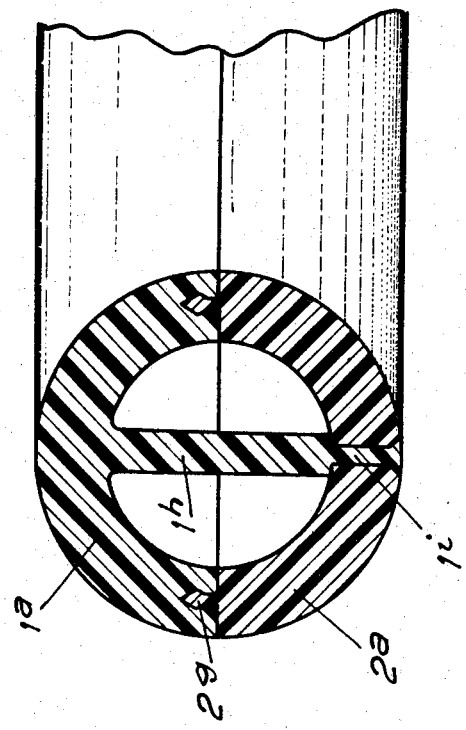
FIG. 6 is a sectional view of a detail of a third embodiment.

As shown in FIGS. 1 to 3, the wheel is formed by two parts or halves substantially symmetrical with respect to a median plane normal to the rotational axis of the wheel. Each of the halves includes a hollow annular or dished rim portion 1a or 2a of substantially semi-circular section, defining relatively wide grooves or depressions 1k or 2k, to which there are secured two radial spokes 1b or 2b of hollow form; these spokes also have a substantially semi-circular cross-section and are connected to one another by a central solid hub portion 1c or 2c which serves for securing the wheel to a steering column.

The two parts of the wheel are in contact with one another along plane surfaces such as 1d or 2d (see FIG. 3). A relatively narrow depression of groove 1e or 2e of semi-circular section is provided in each of the contact or mating surfaces of the two rim portions to form an annular channel concentric with the annular void defined by grooves 1k and 2k.

In order to assemble one part of the wheel to the other, resistance wires 3 are disposed in the channels formed by the depressions or grooves 1e, 2e of one of the parts in such a manner that each wire extends substantially over the whole of the length of these grooves and also presses outwardly of the wheel, preferably at the central part 1c or 2c. Thus, for example, it is possible to provide two wires each of which enters at the central hub portion in an internal groove of one of the spokes, passes along an internal groove of the annular portion and returns to the central portion along a groove of the other spoke. A third wire leads to the interior of one of the spokes in order to pass completely around the annular portion by the outer groove and return to the central hub portion through the interior of the same spoke. The paths of the wires are indicated, in part, by chain lines in FIG. 2.

The second part, into the grooves of which the wires have just been fitted, is then juxtaposed with the first part and then a current can be passed through the wire. This current heats and partially melts the mating surfaces 1d and 2d at the junction between the parts. The two parts are thus thermally welded or fused together.

It therefore remains only to cut off the wires flush with the surface of the wheel. The roughness which may remain is not harmful because such roughness would be present at locations remote from the parts held normally by the driver.

If desired, the annular portion of one of the parts can include a locating tongue or rim such as shown at 1f (FIG. 3) which engages in a complementary recess in the other part.

Figure 4:
FIG. 4 is a view similar to FIG. 3, showing a modification in which the two parts are assembled together by an adhesive.

FIG. 4 shows a modification in which the two parts of the wheel are assembled with the aid of an adhesive. In this case it is useful to provide, as shown, a projection of such form that the two parts interengage.

Figure 5:
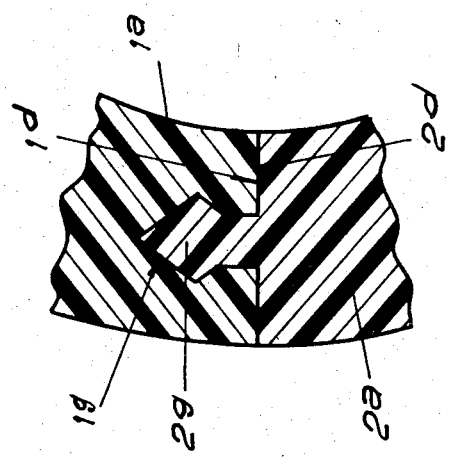
FIG. 5 is a sectional view of a detail of a second embodiment.

In FIG. 5 the wheel is formed, as in the previously described embodiments, of two parts which are substantially symmetrical with respect to a median plane normal to the axis of rotation. However, one of the parts has securing nipples or other projections 2g protruding from the surface of the joint 2d and capable of being forced into complementary recesses 1g provided in the mating surface 1d of the other part. The nipples 2g and their recesses 1g can be formed in the annular portion 1a, 2a of the wheel, as shown, and/or in the arms or spokes.

In order to assemble the two parts of the wheel, the two surfaces 1d and 2d are coated with an adhesive or a material which is a solvent for the plastic material of which the parts are formed and the latter are brought together while the nipples 2g are forced into the recesses 1g.

In the embodiment of FIG. 6, the securing nipples 2g and their recesses 1g are again provided, but the upper part is rigid with cross-pieces 1h whose length is equal to the internal diameter of the circular void of the wheel and which are prolonged by extensions of reduced diameter 1i capable of being introduced into apertures in the lower member (as shown in the drawing).

In order to assemble the wheel the two parts are placed on one another and the nipples 2g are forced into the recesses 1g while the extensions 1i introduced into their respective apertures. Thereafter the extensions are deformed in the manner of rivets, and this deformation can be carried out in the cold when the plastic material used for the manufacture of the wheel is, for example, a polycarbonate. This riveting is effected from beneath the wheel and is not therefore visible.

I claim:

1. A steering wheel comprising a pair of substantially symmetrical wheel halves of thermoplastic material each with an annular rim portion, a central hub portion and radial spokes interconnecting said rim and hub portions; said rim portion being formed with a relatively wide annular groove and with a relatively narrow annular depression adjacent said groove, the wide grooves of said halves registering with each other to form a circular void in the rim of the wheel, the narrow depressions of said halves registering with each other to form a circular channel concentric with said void; and electrically conductive wire means lodged in said channel, said halves being thermally fused to each other in the vicinity of said wire means.

2. A steering wheel as defined in claim 1 wherein said wire means extends from said rim portions through said spokes and terminates at said hub portions.

3. A steering wheel as defined in claim 1 wherein said channel is disposed inwardly of said void, said rim portions being provided with other relatively narrow annular depressions forming a second channel outwardly of said void, said wire means occupying both said channels.

4. A steering wheel as defined in claim 1 wherein said rim portions are provided with interengaging annular formations concentric with said void and said channel.

References Cited

UNITED STATES PATENTS

| | | | |
|---|---|---|---|
| 1,375,360 | 4/1921 | Burke | 264—27 |
| 3,263,268 | 8/1966 | Flaherty | 264—27 |
| 2,163,450 | 6/1939 | Preble | 74—552 |
| 2,215,677 | 9/1940 | Walker | 74—552 |

FOREIGN PATENTS 416,041  9/1934  Great Britain.

W. S. RATLIFF, *Assistant Examiner.*

FRED C. MATTERN, JR., *Primary Examiner.*